United States Patent [19]

Giannetti

[11] Patent Number: 5,214,989
[45] Date of Patent: Jun. 1, 1993

[54] QUICK SETTING AND RELEASE MACHINE TOOL POST

[76] Inventor: Enrico R. Giannetti, Rte. 2, Box 75B, East Bernard, Tex. 77435

[21] Appl. No.: 766,441

[22] Filed: Sep. 26, 1991

[51] Int. Cl.⁵ .............................................. B23B 29/28
[52] U.S. Cl. ....................................... 82/159; 82/160; 82/161
[58] Field of Search .................. 82/158, 159, 160, 161

[56] References Cited

U.S. PATENT DOCUMENTS

| | | | |
|---|---|---|---|
| 2,730,918 | 1/1956 | Daugusta | 82/159 |
| 2,878,705 | 3/1959 | Hirvonen | 82/158 |
| 2,972,272 | 2/1961 | Sirola | 82/159 |
| 3,311,005 | 3/1967 | Nix | 82/158 |
| 3,572,195 | 3/1971 | Gourley | 82/158 |
| 3,911,767 | 10/1975 | Myers | 82/161 |
| 4,126,067 | 11/1978 | Giannetti | 82/159 |
| 4,286,485 | 9/1981 | Dezvane et al. | 82/158 |
| 4,520,701 | 6/1985 | Watamura | 82/158 |

Primary Examiner—Z. R. Bilinsky
Attorney, Agent, or Firm—James L. Jackson

[57] ABSTRACT

A quick setting and release machine tool post having a body block structure forming a pair or partial dove tail tool mounts externally thereof. The body block also forms a pair of expander receptacles each receiving a dove tail expander element in movable assembly therewith. A rotary actuator located within an actuator receptacle defined by the body block forms oppositely directed intersecting eccentric cam surfaces that are disposed for driving engagement with respective dove tail expander elements depending upon the direction of rotation of the actuator element. The dove tail expander elements are selectively linearly movable to establish tight locking engagement within the dove tail receptacles of tool holders and are retractable to release the tool holders for replacement or repositioning. The design and operational characteristics of the tool post mechanism minimizes wear of component parts and promotes long service life.

20 Claims, 2 Drawing Sheets

QUICK SETTING AND RELEASE MACHINE TOOL POST

FIELD OF THE INVENTION

This invention relates generally to machine tool posts for attachment to the machine tool bed or compound of a machine tool such as a lathe. More specifically, this invention is directed to a quick setting and release machine tool post having plural dove tail mounts that are quickly and simply adjustable for locking holders for cutting tools in immovable assembly therewith and for quick release of such tool holders when movement or replacement of such tool holders is desired.

BACKGROUND OF THE INVENTION

In an effort to promote high productivity of various types of machine tools, a number of differing types of quick release machine tool posts have been developed to minimize the machine down time that is required for installation, machine set up, tool changing and repositioning, etc. Examples of such quick change tool posts are evident from the teachings of U.S. Pat. Nos. 1,106,745 of Stevens, 1,265,815 of Price, 2,862,408 of Stirrett, 2,972,272 of Sirola and 4,286,485 of Bezvane, et al. Additionally, U.S. Pat. No. 4,126,067 of Giannetti, of common inventorship herewith, also evidences the progressive development of quick release machine tool posts.

In the case of more developed quick release or quick change tool posts, the object has been the adjustable positioning of wedges that are typically slidable within grooves, which wedges are driven by threads or thread actuated cams. Although these devices function quite satisfactorily for the purposes intended, because of the abrasive environment of use and frequency of operation they tend to become worn quite quickly and become sufficiently unserviceable that the stability of the tool posts and the accuracy of the machine tool can be impaired. In such cases it becomes necessary to change out worn parts at significant expense and in some cases it becomes necessary to replace the entire machine tool post at even greater expense. Those dove tail mount locking and unlocking elements, typically referred to as "wedges" which are driven by the interaction of threads, are especially susceptible to wear. Moreover, dove tail wedges of this nature are very expensive so that the overall cost of machine tool operation is quite significant. It is desirable, therefore, to provide a quick change or quick release tool post mechanism that is designed to minimize wear so that it remains serviceable for extremely long periods of time even under circumstances of heavy use in high production activities. It is also desirable to provide a dove tail locking and unlocking mechanism that is simple in nature as well as being of minimal cost so that maintenance expense is minimized.

SUMMARY OF THE INVENTION

It is therefore a principal feature of the present invention to provide a novel quick setting and release tool post having adjustable dove tail assemblies that are capable of lateral expansion into extremely tight and secure assembly with a tool holder so as to support the tool holder and its tool in immovable assembly with the tool post mechanism.

It is an even further feature of this invention to provide a novel quick setting and release tool post mechanism having one or more adjustable dove tail mounts thereon incorporating dove tail expansion segments that are driven laterally for expansion of the dove tail mount by means of a rotary actuator having at least one cam surface thereon.

It is another feature of this invention to provide a novel quick setting and release tool post assembly having a pair of adjustable dove tail mounts thereof each incorporating a dove tail expansion segment with both segments being selectively driven for expansion by a rotary actuator having a pair of oppositely directed cam surfaces defined thereon.

It is another feature of this invention to provide a novel quick setting and release tool post assembly having plural adjustable dove tail mount assemblies, each having dove tail expansion segments or wedges that are retained in movable assembly with the tool post and each being selectively driven by respective ones of two oppositely directed eccentric cam surfaces of a rotary actuator depending upon the direction of actuator rotation.

Briefly, the concept of the present invention is realized through the provision of a quick setting and release machine tool post assembly having a body block that forms at least one and preferably a plurality of adjustable dove tail tool holder mounts that have the capability of establishing a secure locking engagement within the dove tail recess of a cutting tool holder. Each of the dove tail tool holder mounts of the tool post body block forms a receptacle that receives a dove tail expander segment in laterally and linearly movable relation therein. The receptacles for the dove tail expander elements intersect a centrally located, generally circular actuator receptacle defined within the body block so that inner portions of the dove tail expander segments are exposed to the actuator receptacle for selective driving engagement by respective oppositely directed eccentric cam surfaces that are defined by a rotary actuator element. Thus, upon rotation of the actuator element in one direction, one of the dove tail expander segments of one of the adjustable dove tail mounts is driven outwardly to expand the dove tail mounts into tightly locked engagement within the dove tail recess of a tool holder. Upon such rotary movement of the actuator element, the opposite dove tail expander segment is permitted to move linearly to a retracted position thus contracting its adjustable dove tail mount to release the locking engagement thereof within the dove tail groove of a tool holder so that the tool holder is released for replacement or repositioning with respect to its adjustable dove tail mount.

The rotary actuator is positioned for rotation about a collar tube that is threaded into fixed engagement with the body block so that the actuator is rotatable about the axis or rotation defined by the collar tube. The axis of actuator rotation is oriented in normal relation to the planar support surface of the body block so as to position the axis in normal relation to the planar working surface of the machine tool bed. The collar tube includes a retainer head at its outer end that secures the rotary actuator against linear movement relative to the body block. The tool post assembly is secured to machine tool bed or compound of a machine tool by a T-head or slide block assembly that is positioned within an undercut slot of the machine tool bed and by a retainer post member that is secured to the T-Head assembly. The retainer post is provided with an outer assembly nut that urges the collar tube and thus also the body block into firm immovable seated engagement with the planar working face of the machine tool.

The dove tail expander segments of the adjustable dove tail mounts are positioned for restricted linear movement within expander segment receptacles formed in the body block and are retained in movable assembly with the body block by means of one or more retainer elements that extend from the body block into elongate grooves of the expander elements. The retainer elements may take the form of set screws which are in threaded assembly with the body block with end portions thereof being received within the elongate grooves so as to permit desired linear and lateral movement of the expander elements between locked and retracted positions thereof. The retainer element prevents the expander segments from becoming inadvertently separated from the body block when a tool holder is not present on the dove tail mount. Apparatus is also provided to restrict rotational movement of the actuator element to a rotational range of about 90°, such movement being sufficient to urge an expander segment to the locked position upon one direction of actuator rotation and to permit movement of the expander segment to its retracted position upon opposite rotary movement of the actuator element.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In the Drawings

FIG. 1 is a sectional view taken along line 1—1 of FIG. 2 and illustrating a quick setting and release tool post mechanism that is constructed in accordance with the present invention, FIG. 1 illustrating in broken line a machine tool bed or compound and a cutting tool holder with its cutting tool therein.

FIG. 2 is a plan view of the quick setting and release tool post mechanism of FIG. 1 with parts thereof broken away and shown in section and with the tool holder and its tool illustrated in broken line.

FIG. 3 is a sectional view in plan representing the quick setting and release tool post mechanism of FIGS. 1 and 2 and illustrating one dove tail expander segment at its retracted position and the other expander segment expanded by the cam surface of the actuator to its lock position with respect to a tool holder and tool shown in broken lines.

FIG. 4 is an elevational view of the quick setting and release tool post mechanism of FIGS. 1-3 with parts thereof broken away along lines 4—4 of FIG. 3 and shown in section.

DETAILED DESCRIPTION OF PREFERRED EMBODIMENT

Figure 1:
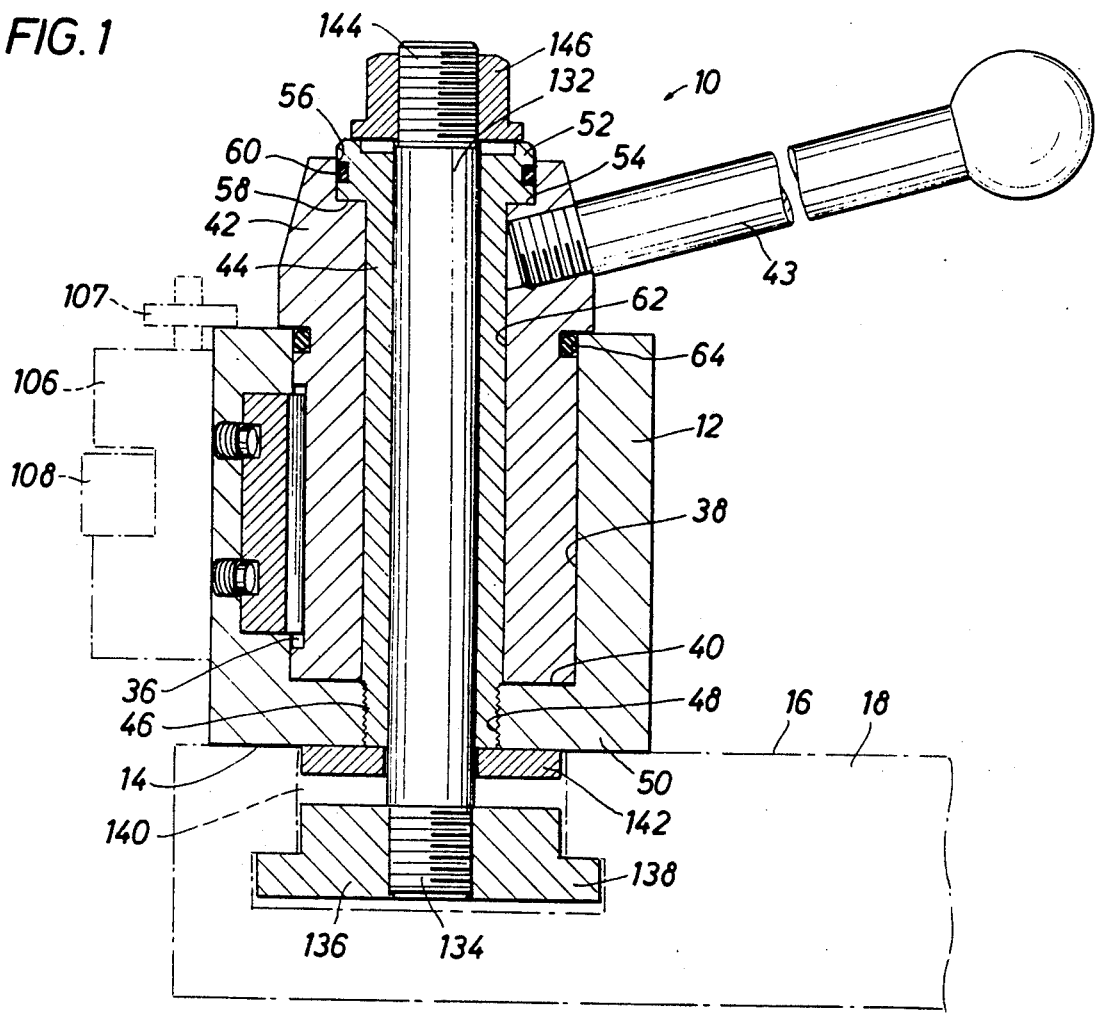
Figure 2:
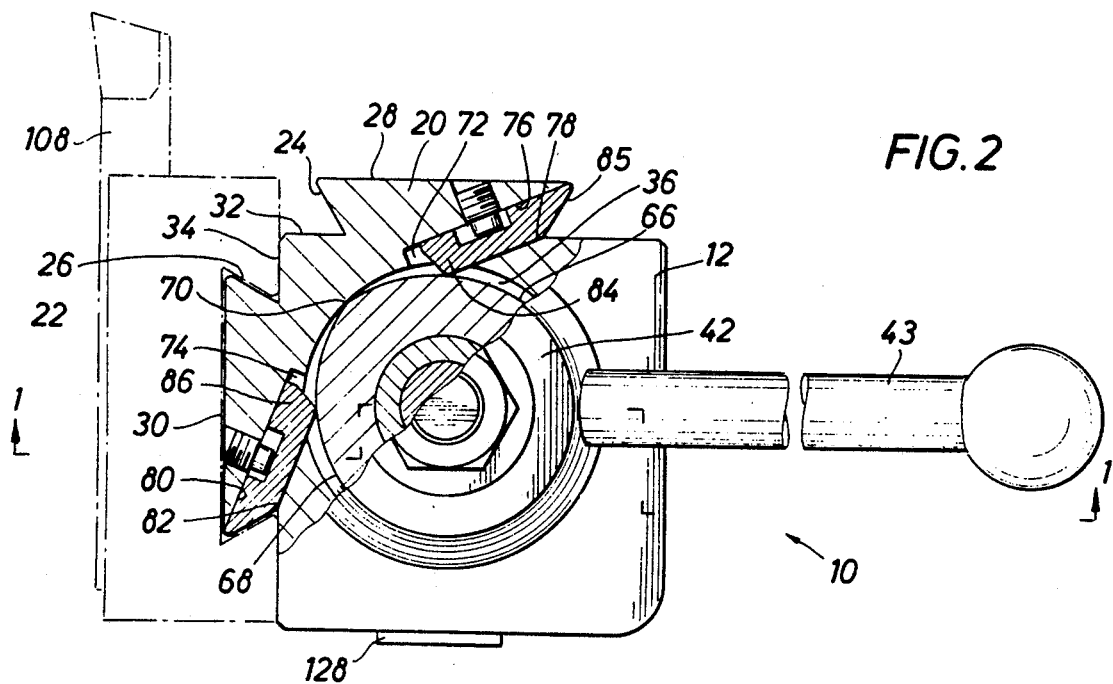

Referring now to the drawings and first to FIGS. 1 and 2 a quick setting and release machine tool post constructed in accordance with the principles of this invention is illustrated generally at 10 and incorporates a body block structure 12 having a lower planar surface 14 that is typically disposed in face-to-face tightly seated relationship with respect to the upper planar working surface 16 of a machine tool bed or compound 18 shown in broken line. The body block 12 is formed externally to define at least one and preferably a pair of integral, partial dove tail mount projections 20 and 22 having tapered undercut surfaces 24 and 26 that are positioned in intersecting relation with flat face surfaces 28 and 30 and with flat body block surfaces 32 and 34. Typically the included angle between the respective inclined surfaces 24 and 26 and the respective flat surfaces 30 and 32 will be in the order of 60° but it is to be born in mind that such is not limiting with respect to the present invention.

The body block 12 also defines a generally cylindrical internal receptacle 36 having a generally cylindrical internal wall 38 and a generally planar lower wall 40. Within the actuator receptacle 36 is located a rotary actuator 42 which is rotatably supported about a centrally located collar tube 44. The collar tube 44 is provided with an externally threaded lower extremity 46 that is received within an internally threaded opening 48 which is formed in the lower wall structure 50 of the body block. The upper or outer extremity of the collar tube 44 forms an enlarged retainer head structure 52 which is partially receivable within a circular receptacle at the upper or outer portion of the rotary actuator which receptacle is defined by a circular stop shoulder 54 and a cylindrical surface 56. The enlarged head 52 of the collar tube forms a downwardly directed stop shoulder 58 which restricts linear movement of the rotary actuator.

The enlarged head 52 of the collar is also provided with a circular seal 60 which is retained within an appropriate seal groove and which functions to prevent debris such as metal particulate, dirt, dust. etc. from entering the collar passage 62 of the rotary actuator. Another circular seal 64 is retained within an external seal groove defined by the rotary actuator 42 and prevents such debris from entering the actuator receptacle from its upper end.

Figure 3:
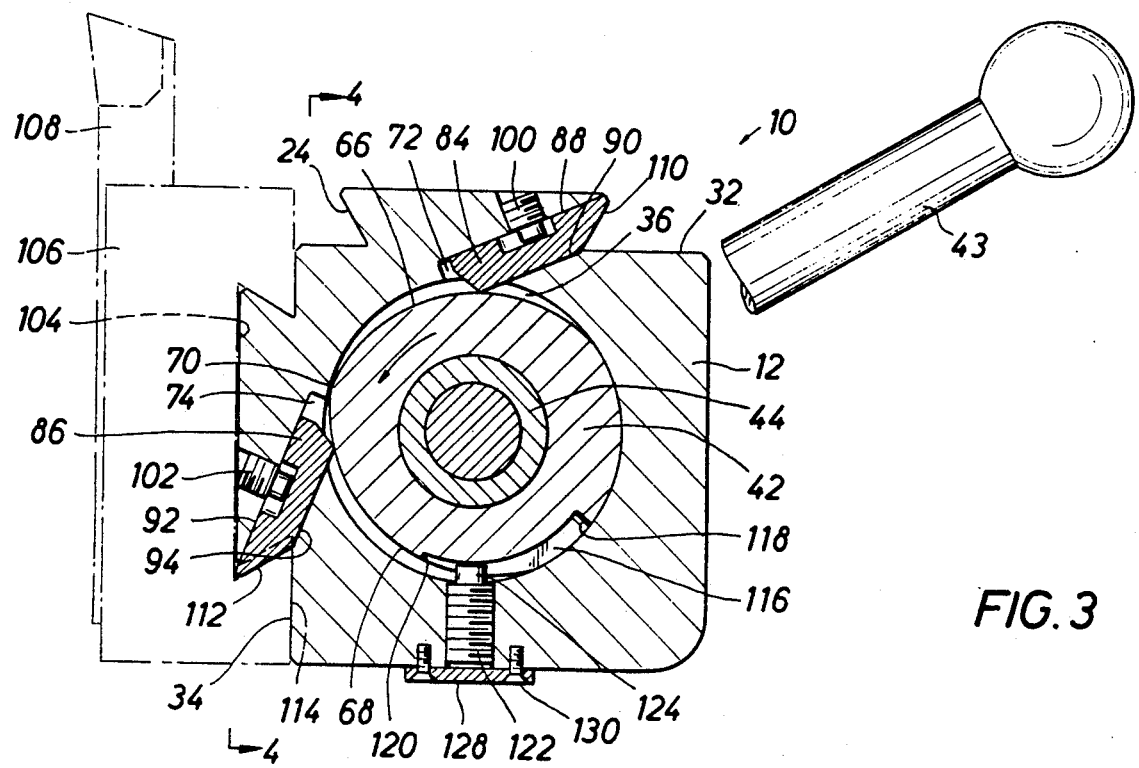

As shown in FIGS. 2 and 3 the rotary actuator 42 is provided with a pair of oppositely directed external eccentric cam surfaces 66 and 68 which in intersect along a line 70. These eccentric cam surfaces are of course exposed within the actuator receptacle 36.

The body block structure 12 of the tool post also defines a pair of dove tail expander receptacles 72 and 74 that are in communication with the actuator receptacle 36. Dove tail expander receptacle 72 is defined in part by spaced parallel surfaces 76 and 78 while parallel spaced surfaces 80 and 82 form surface portions of the dove tail expander receptacle 74. A pair of dove tail expander segments 84 and 86 are movably positioned respectively within the expander receptacles 72 and 74. As is evident particularly from the sectional view of FIG. 3, dove tail expander segment 84 defines generally parallel opposed surfaces 88 and 90 that have guided relationship with the respective guide surfaces 76 and 78 of the dove tail expander receptacle 72. The dove tail expander segment 86 is essentially a mirror image of the segment 84 and forms opposed parallel guide surfaces that establish guided relation with the respective opposed planar surfaces 80 and 82 of the receptacle 84. As shown by the views of FIGS. 3 and 4 the inner or follower portions of each of the dove tail expander segments are exposed within the actuator receptacle 36 for following contact with respective ones of the eccentric cam surfaces 66 and 68.

Figure 4:
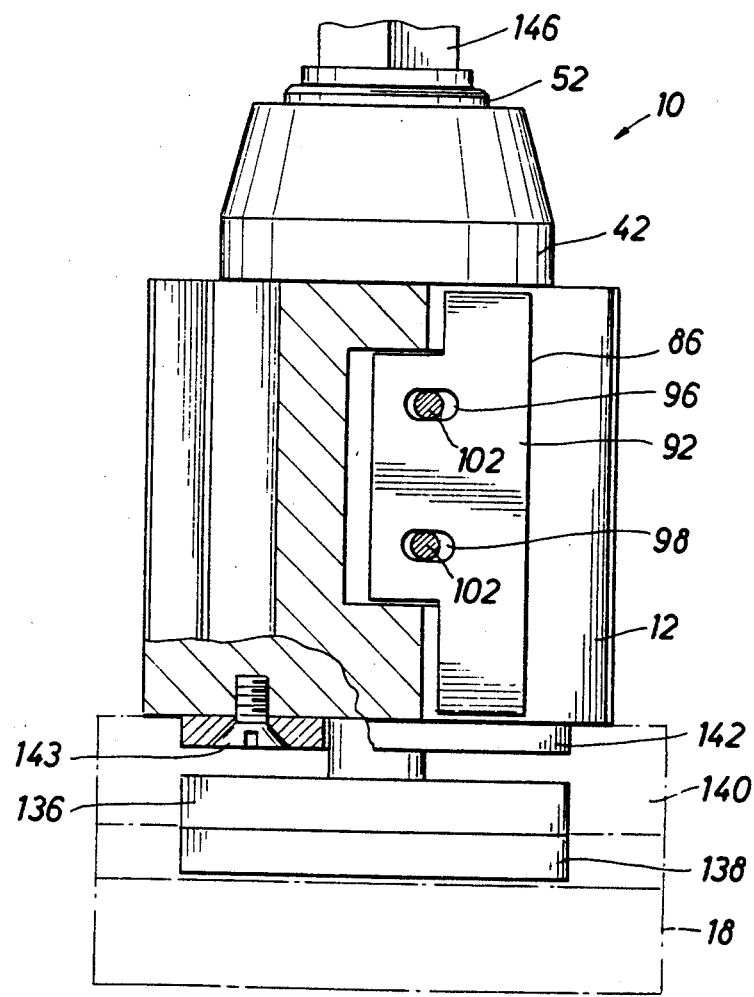

To permit linear movement of the expander segments within their respective receptacles and yet provide for retention of the expander segments in assembly with the body block, each of the expander elements define at least one and preferably a pair of elongate retainer receptacles such as shown at 96 and 98 in FIG. 4. Retainer elements 100 and 102 in the nature of set screws are threadedly received within threaded apertures in the dove tail mounts of the body block and provide retainer projections that extend into the respective retainer receptacles. The expander segments are therefore permitted linear movement within their respective segments to the extent defined by the length of retainer receptacles 96 and 98. Such extent of linear movement, however, is not required for positioning of the expander segments at the fully locked and fully released positions thereof. For example, as shown in FIG. 3, expander segment 84 is as its retracted or release position by virtue of counterclockwise rotation of the actuator 42 and the consequent position of the eccentric cam surface 66. The expander element 86, however, due to counterclockwise actuating rotation of the rotary actuator 42 is shown to be shifted linearly and laterally to its locking position with respect to the internal dove tail locking groove 104 of the tool holder shown in broken lines at 106 for support of the cutting tool 108. Even though the expander segment 86 has been moved linearly from the broken line position to the solid line position thereof, the retainer projection 102 is out of contact with the inner end surface of its retainer receptacle. It should be born in mind that the line of intersection between the opposed cam surfaces 66 and 68 will not come into contact with the follower surface portions of either of the respective expander segments. Thus, at the fully locked position of the expander segment 84 the line of intersection 70 of the cam surfaces will be positioned essentially as shown in FIG. 3.

Each of the expander segments 84 and 86 define respective tapered dove tail surfaces 110 and 112. When positioned as shown in FIGS. 2 and 3, the planar surfaces 110 and 112 have an angular relationship width of about 60° with respect to the planar surface 32. As either of the expander segments are moved from the retracted or unlocked position thereof to the locked position, i.e., from the position shown at 86 in FIG. 2 to the position shown in FIG. 3, the interacting relationship of the external expandable dove tail assembly with the fixed internal dove tail slot or recess of the respective tool holder will cause the tool holder to be urged in a direction toward the body block. This will cause the planar face surface 114 of the tool holder 106 to be drawn into firmly seated tight engagement with the respective planar face surface 34 of the body block 12. The tool holder 106 is therefore stabilized by the body block and becomes essentially integral and immovable with the body block when such locking engagement has been established. The cutting tool 108 is therefore also stabilized and is capable of precision cutting even under circumstances where heavy metal cuts are being taken.

In order to limit rotation of the actuator element 42 the actuator is formed externally to define an arcuate slot 116 having shoulder surfaces 118 and 120 at opposite extremities thereof. A stop element 122 is threadedly retained within an internally threaded passage of the body block and provides a stop projection 124 that is located within the arcuate groove although rotation of the actuator element is limited in each rotational direction, under normal circumstances the stop surfaces 118 and 120 will not be contacted by the stop projection at either of the locked or release positions of either of the expander segments. A cover plate 128 is fixed to the body block by means of screws 130 and thus provides for protection against intrusion of debris into the threaded bore for the stop element 122.

In order to install the tool post assembly on a machine tool bed or compound an assembly post or stud 132 is employed having its lower end 134 in threaded engagement with a T-head or slide block 136. The slide block 136 is a conventional tool post mounting element having opposed flanges 138 that engage within the undercut portion of the machine tool slot 140. The assembly stud 132 extends through an aperture in a plate member 142 that is located in the upper portion of the slot 140. At its upper end the assembly stud 132 is provided with a threaded extremity 144 which receives an assembly nut 146. As the assembly nut 146 is tightened on the assembly stud the stud is placed under tensile stress and consequently the body block 12 is forced firmly into face-to-face seated relation with the planar upper surface 16 of the machine tool bed, bringing the lower planar surface 14 into face-to-face seated relation with the upper planar surface 16.

After the tool post assembly 10 has been installed in the manner shown in FIGS. 1, 2, and 4, a tool holder 106 with its cutting tool attached will be positioned with its internal dove tail slot receiving the adjustable dove tail assembly of one of the dove tail machine tool mounts. After this has been done, the operator actuating the handle 43 will be manually operated to impart appropriate rotation to the actuator element 42 in the clockwise or counterclockwise direction as needed to tighten the expander element within the dove tail slot of the tool holder. This tightening is only sufficient to establish frictional engagement that prevents inadvertent upward or downward movement of the tool holder. Thereafter, the adjustment member 107, typically a knurled circular nut is manually adjusted to establish precise positioning of the tool holder on the tool post to thereby properly locate the cutting tool. Thereafter, the rotary actuator is manually rotated to its fully locked position by cam energized expanding movement of the respective segments 84 or 86 into locked engagement with the tool holder as shown in FIG. 3. As the expanding segment is moved linearly outwardly in respect to its respective receptacle 72 or 74 the tapered surfaces 24 and 85 will have camming engagement wit the corresponding internal oppositely inclined surfaces of the internal dove tail recess of the tool holder. This activity causes the tool holder to be firmly drawn into tightly seated and locked engagement with the body block, resulting in a very stable and secure tool supporting relationship. The eccentric cam surface imparts sufficient force to retain the expander segment in its positively locked position. Alternatively, when the actuator element 42 is rotated in the opposite direction, the locked condition of the expander segment will be quickly released and the expander segment will readily slide linearly to its retracted position releasing the adjustable dove tail mount from its locked condition relative to the dove tail slot of the tool holder.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

What is claimed is:

1. A quick setting and release machine tool post for machine tools having a machine tool bed for releasable support of a machine tool holder for supporting a cutting or working tool, comprising:
   (a) a tool post body block adapted to be secured to a machine tool bed and having a flat face for engagement with said machine tool bed, said tool post body block defining at least one dove tail mount for support of a machine tool holder and further defining an axis disposed in normal relation with said flat face;
   (b) a dove tail expander segment having a tapered portion forming a structural component of said dove tail mount being disposed in movable assembly with one side of said dove tail mount and being linearly movable generally toward said dove tail mount and in lateral relation to said axis to expand said dove tail mount and lock said machine tool mount to said dove tail mount and being linearly movable generally away from said dove tail mount, to contract said dove tail mount and unlock said machine tool mount from said dove tail mount to permit its movement and removal therefrom; and
   (c) a rotatable quick setting and release actuator being supported for rotation about said axis and forming at least one external cam surface oriented eccentrically about said axis and disposed for camming engagement with said dove tail expander segment, upon rotation of said quick setting and release actuator in one rotational direction said dove tail expander segment being moved linearly generally toward said dove tail mount by said external cam surface for expansion of said dove tail mount to establish cam energized locking of said tool holder in immovable relation with said tool post body block, upon opposite rotation of said quick setting and release actuator, said external cam surface releasing said camming engagement with said dove tail expander segment to permit linear movement thereof in a direction generally away from said dove tail mount for unlocking said dove tail mount and releasing said tool holder for movement relative to said dove tail mount.

2. The quick setting and release machine tool post of claim 1, wherein:
   (a) said tool post body block defining an expander segment slot; and
   (b) said dove tail expander segment being received for linear guided movement within said expander segment slot and being movably supported by said tool post body block for linear movement in transverse relation to said axis.

3. The quick setting and release machine tool post of claim 1, wherein:
   said dove tail expander segment defining a tapered extremity being oriented to define a moveable undercut side portion of said dove tail mount.

4. The quick setting and release machine tool post of claim 1, including expander segment retainer means securing said dove tail expander segment in movable assembly with said tool post body block.

5. The quick setting and release machine tool post of claim 4, wherein:
   (a) said dove tail expander segment forms at least one elongate retainer receptacle; and
   (b) a retainer element is movably supported by said tool post body block and engages within said elongate retainer receptacle to retain said dove tail expander segment in assembly with said body block and to permit said linear movement of said dove tail expander segment relative to said tool post body block.

6. The quick setting and release machine tool post of claim 5, wherein:
   said dove tail expander segment retainer is defined by a set screw having threaded engagement with said body block and having a portion thereof disposed for engagement within said retainer receptacle of said dove tail expander segment.

7. The quick setting and release machine tool post of claim 1, wherein:
   said at least one external cam surface of rotatable quick setting and release actuator is at least one external eccentric cam surface disposed eccentrically about said axis of rotation and being disposed for camming engagement with said dove tail expander segment.

8. The quick setting and release machine tool post of claim 7, wherein:
   a pair of oppositely directed eccentric cam surfaces are defined by said quick setting and release actuator having a line of intersection being oriented in substantially parallel relation with axis of rotation.

9. The quick setting and release machine tool post of claim 8, wherein:
   (a) said tool post body block forms a pair of dove tail mounts projecting laterally therefrom and being oriented in substantially 90° rotationally spaced relation;
   (b) said quick setting and release actuator is mounted for rotation about said axis of rotation and defines a pair of oppositely oriented eccentric cam surfaces thereon;
   (c) a pair of dove tail expander segments each being retained in movable assembly with said body block and each being linearly movable by respective cam surfaces of said quick setting and release actuator toward the respective dove tail mount for locking of said tool holder to the respective dove tail mount and being released for unlocking movement away from said respective dove tail mount by movement of the respective cam surface away from the respective dove tail expander segment.

10. The quick setting and release machine tool post of claim 1, wherein:
    (a) said tool post body block is formed to define an actuator receptacle and at least one expander segment receptacle having communication with said actuator receptacle;
    (b) said rotatable quick setting and release actuator being located for rotation within said actuator receptacle; and (c) said dove tail expander segment being positioned for linear movement within said expander segment receptacle with a portion thereof extending into said actuator receptacle and disposed for camming engagement by said external cam surface of said rotatable quick setting and release actuator.

11. The quick setting and release machine tool post of claim 1, wherein:
   (a) said tool post body block defines a pair of dove tail mounts projecting laterally therefrom and being oriented in substantially 90° rotationally spaced relation;
   (b) said tool post further defines an actuator receptacle and a pair of expander segment receptacles each being in communication with said actuator receptacle, said expander segment receptacles being disposed in oppositely directed relation;
   (c) said rotatable quick setting and release actuator being rotatable located within said actuator receptacle about said axis and defining a pair of oppositely directed cam surfaces thereon each being disposed eccentrically about said axis; and
   (d) a pair of said dove tail expander segments being positioned for said linear movement within respective ones of said expander segment receptacles and having portions thereof located within said actuator receptacle and disposed for camming engagement with respective ones of said oppositely directed eccentric cam surfaces.

12. A quick setting and release machine tool post for supporting tool holders and tools of metal working machines, comprising:
   (a) a tool post body block forming a pair of external adjustable dove tail mounts and forming an actuator receptacle having a substantially central axis of rotation, said body block further forming a pair of expander segment receptacles each having communication with said actuator receptacle;
   (b) a pair of dove tail expander segments each having a tapered end portion for forming a part of a respective dove tail mount and being located for linear movement within respective dove tail expander segment receptacles and each having a cam follower portion thereon which extends into said actuator receptacle; and
   (c) an actuator element being positioned within said actuator receptacle for rotation about said axis of rotation and having a pair of cam surfaces defined in eccentric relation with said axis of rotation and oriented for selective camming engagement with said cam follower portions of respective dove tail expander segments for linear movement thereof toward the respective dove tail mount for locking of said tool holder to said dove tail mount.

13. The quick setting and release machine tool post of claim 12, wherein:
   said plurality of cam surfaces are oppositely oriented, external eccentric surfaces defined by said actuator element.

14. The quick setting and release machine tool post of claim 12, wherein:
   (a) said actuator element defines a central bore therein; and
   (b) an actuator retainer member being located within said central bore and being releasably secured to said body block and retaining said actuator element for rotary movement within said actuator receptacle.

15. The quick setting and release machine tool post of claim 14, wherein said machine tool bed defines at least one undercut slot for attachment of said quick setting and release machine tool post and the like thereto and:
   (a) a slide block being adapted for positioning in said undercut slot of said machine tool bed;
   (b) a collar tube being fixed to said tool post body block and extending through said actuator receptacle;
   (c) an assembly post extending through said collar tube and is received in threaded engagement with said slide block; and
   (d) an assembly nut being threadedly received by said assembly post and having bearing and retaining engagement with said collar tube.

16. The quick setting and release machine tool post of claim 15, wherein:
   said collar tube retains said actuator element in rotatable relation within said actuator receptacle and restrains said actuator element against linear movement.

17. The quick setting and release machine tool post of claim 12, wherein:
   (a) said dove tail expander segments each define at least one elongate retainer groove; and
   (b) expander retainer elements being supported by said body block and having portions thereof disposed in retaining engagement within said elongate retainer receptacles thus retaining said expander elements in linearly movable assembly with said tool post body block.

18. The quick setting and release machine tool post of claim 12, including means in assembly with said body block for limiting rotation of said actuator element in at least one rotational direction thereof.

19. The quick setting and release machine tool post of claim 12, wherein said cam surfaces are eccentric cam surfaces disposed in intersecting relation and intersecting at a line being parallel with said axis of rotation.

20. A quick setting and release machine tool post for machine tools having a machine tool bed for releasable support of a machine tool holder for supporting a cutting or working tool, comprising:
   (a) a tool post body block adapted to be secured to a machine tool bed and having a flat face for engagement with said machine tool bed, said tool post body block defining at least one dove tail mount for support of a machine tool holder and further defining an axis disposed in normal relation with said flat face;
   (b) a dove tail expander segment being disposed in movable assembly with one side of said dove tail mount and being linearly movable in a locking direction being generally away from and in lateral relation to said axis to expand said dove tail mount and lock said machine tool mount to said dove tail mount and being linearly movable in an unlocking direction being generally away from and in lateral relation with said axis to contract said dove tail mount and thus unlock said machine tool mount from said dove tail mount to permit its movement therewith and removal therefrom; and
   (c) a rotatable quick setting and release actuator being supported for rotation in locking and unlocking rotational directions about said axis and defining at least one external cam surface oriented eccentrically about said axis and disposed for camming engagement with said dove tail expander segment, upon rotation of said quick setting and release actuator in one rotational direction, said dove tail expander segment being moved linearly in a direction generally away from said axis for cam energized expanding and locking of said dove tail mount to support said tool holder in immovable relation with said tool post body block, upon rotation of said quick setting and release actuator in said unlocking direction, said external cam surface releasing said camming engagement with said dove tail expander segment to permit linear movement thereof in a direction generally away from said axis for contraction of said dove tail mount and releasing said tool holder for movement relative to said dove tail mount.

* * * * *